July 9, 1946.  H. F. SCHMIDT  2,403,878
BLOWER APPARATUS
Filed Nov. 26, 1943

INVENTOR
HENRY F. SCHMIDT.
BY
ATTORNEY

UNITED STATES PATENT OFFICE 2,403,878

BLOWER APPARATUS

Henry F. Schmidt, Lansdowne, Pa., assignor to Westinghouse Electric Corporation, East Pittsburgh, Pa., a corporation of Pennsylvania Application November 26, 1943, Serial No. 511,786

2 Claims. (Cl. 230—209)

This invention relates to propeller-type blowers, and has for an object to provide improved cooling means for lubricant discharged from the bearings thereof.

Another object of the invention is to provide novel means for inducing flow of cooling air over the coil of an air cooler.

Figure 1:
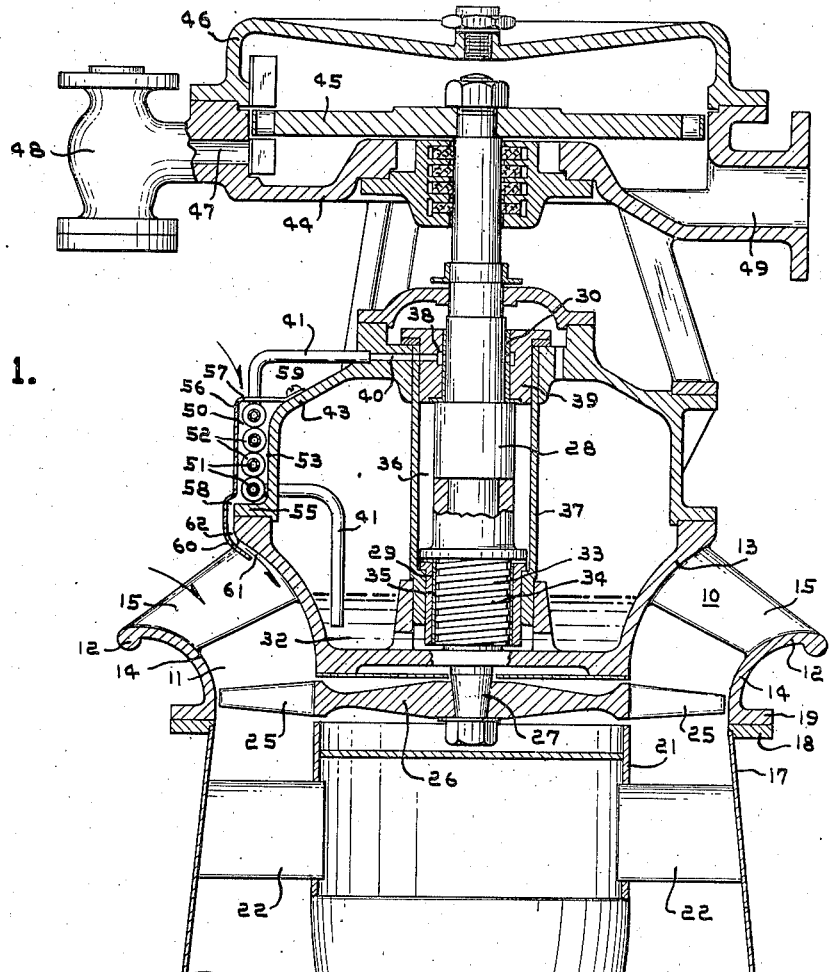
Figure 2:
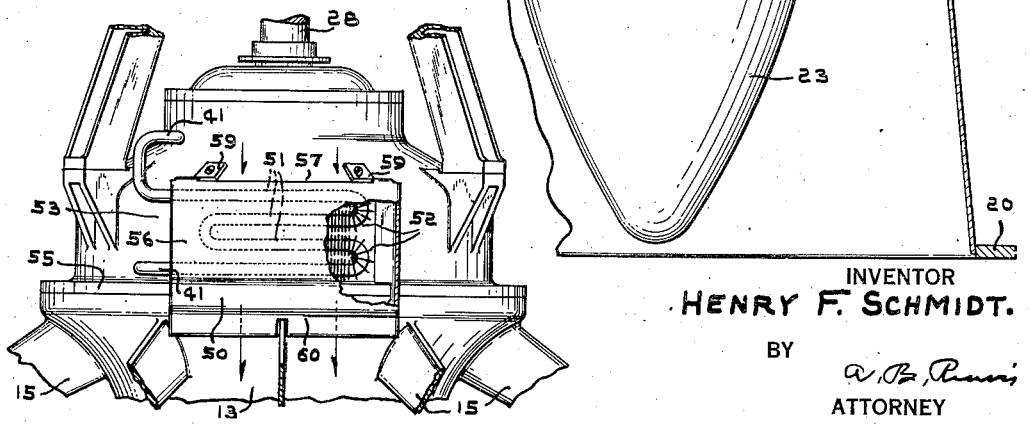

These and other objects are effected by the invention as will be apparent from the following description and claims taken in connection with the accompanying drawing, forming a part of this application, in which:

Fig. 1 is a vertical sectional view through a propeller blower embodying the principles of the present invention; and Fig. 2 is a fragmentary side elevational view of a portion of the structure shown in Fig. 1, a portion thereof broken away for the sake of clearness.

Referring now to the drawing more in detail, the reference character 10 indicates, in its entirety, a double-walled casing providing an annular passage 11 for flow of air through the blower. The casing includes an upper inlet casting 12, comprising an inner wall 13 and an outer wall 14, joined by radially extending pretwist guide vanes 15.

The outlet portion of the double-walled casing is formed by an outer arcuate wall 17, having a flange 18 at its upper edge, secured to a mating flange 19 at the lower edge of the inlet casting 12. The flared lower edge of the wall 17 is provided with a flange 20, by which the entire blower structure may be secured to a suitable supporting structure, for example, the deck of a vessel. The inner wall of the outlet portion of the air passage 11 is provided by a tubular wall portion 21, supported from the outer wall 17 by a plurality of radially extending discharge guide vanes 22. A fairing member 23 is secured to and depends from the lower edge of the tubular member 21 and provides a streamlined exit from the air flow passage 11.

A plurality of propeller blades 25 are positioned within the air passage 11, at the throat portion thereof, between the inlet and outlet portions, and are supported by a hub 26, mounted on the lower terminal portion 27 of the vertically disposed shaft 28.

The shaft is supported by a lower combined radial and thrust bearing 29 and an upper radial bearing 30. The inner wall 13 of the inlet casting 12 provides a reservoir 32 for lubricant, the lubricant being maintained at a sufficient level to keep the lower end of the bearing 29 submerged therein. A viscosity pump 33 is provided by a spiral groove 34, formed in the outer surface of the shaft journal 35, this viscosity pump drawing lubricant through the lower bearing 29 and forcing it upwardly through the passage 36, provided between the shaft 28 and the tubular sleeve 37 surrounding and spaced from the latter, to the upper bearing 30, where the lubricant discharged therefrom is received in the lubricant discharge groove 38, formed in the inner surface of the bearing housing 39. A radially extending passage 40 conducts lubricant from the groove 38 to the conduit 41, through which the lubricant is returned to the reservoir 32.

A bearing casing 43 provides a support for the turbine 44 which drives the shaft 28, this turbine comprising a rotor 45 disposed within the housing or stator 46, suitable motive fluid, such as steam, being admitted thereto through the inlet passage 47, controlled by the valve 48, the exhaust of the fluid leaving the housing through the outlet 49.

The lubricant return conduit 41 is provided with an intermediate cooler section 50, in the form of convolutions 51, preferably provided with cooling fins 52. Preferably, these convolutions are curved to fit close to the circular outer surface 53 of the bearing casing 43, just above the flange 55 thereof, where they will be substantially out of the way and therefore protected from injury. An outer casing 56 cooperates with the side wall 53 of the bearing casing 43, to form an enclosure for the cooling section 50 of the conduit 41, the enclosure being open at the top, at 57, and at the bottom, at 58. If desired, the upper edge of the casing 56 may be braced or secured to the bearing casing 43 by integral strips 59.

The outer casing 56 extends downwardly below the flange 55 of the bearing casing 43, at 60, and projects a short distance into the inlet portion of the annular air passage 11, whereby, as air is drawn into the passage 11 by the propeller blades 25, the lower pressure existing at the outlet end 61 of the passage 62 from the cooler outlet 58, provides a suction at this point which draws air into the cooler enclosure through the inlet 57 for passage through the cooler in contact with the finned convolutions thereof.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a propeller-type blower, a double-walled casing providing an annular passage for flow of air; a propeller in the passage and having a hub; a vertical shaft carrying the hub; a pair of vertically-spaced bearings supporting the shaft; a casing structure enclosing said bearings; a lubricant reservoir; means for supplying lubricant from the reservoir to the bearings; a conduit for returning lubricant from the bearings to the reservoir; said conduit including an intermediate cooling section disposed in close proximity to the outer surface of the bearing casing structure; an auxiliary wall structure cooperating with said outer surface of the bearing casing structure to provide a closure for the conduit cooling section, said closure having an air inlet at the top and an air outlet at the bottom; and means placing said outlet in communication with the annular air passage of the blower, whereby the flow of air through said annular air passage induces flow of air through the enclosure in heat-exchange relation to the conduit cooling section.

2. Structure as specified in claim 1, wherein the intermediate cooling section of the lubricant return conduit comprises a plurality of parallel sections of conduit, each section being connected at one end to the corresponding end of one adjacent section and at the opposite end to the other adjacent section whereby a continuous convoluted conduit is provided, and all of said parallel sections or convolutions being curved in the same arc whereby they are disposed in close proximity to the cylindrical outer surface of the bearing casing structure.

HENRY F. SCHMIDT.